United States Patent [19]
Nagumo

[11] Patent Number: 5,175,954
[45] Date of Patent: Jan. 5, 1993

[54] FISH CAPTURING DEVICE

[75] Inventor: Seiji Nagumo, 377 Imaicho, Isesakishi, Gunma, Japan

[73] Assignee: Seiji Nagumo, Gunma, Japan

[21] Appl. No.: 859,094

[22] Filed: Mar. 27, 1992

[30] Foreign Application Priority Data

May 10, 1991 [JP] Japan ............... 3-133394

[51] Int. Cl.⁵ .............................. A01K 83/00
[52] U.S. Cl. ............................. 43/36; 43/37
[58] Field of Search ............ 43/34, 35, 36, 37, 42, 43/42.02, 42., 04, 42.06, 42.22

[56] References Cited

U.S. PATENT DOCUMENTS

| | | | |
|---|---|---|---|
| 1,333,564 | 3/1920 | Murray | 43/37 |
| 1,430,642 | 10/1922 | Gross | 43/35 |
| 2,087,955 | 7/1937 | Middlemiss | 43/37 |
| 2,889,656 | 6/1959 | Zalonis | 43/37 |
| 3,266,185 | 8/1966 | Abramson, Jr. | 43/37 |
| 3,757,452 | 9/1973 | Parker | 43/42.25 |
| 3,952,444 | 4/1976 | Hameen-Anttila | 43/36 |
| 4,158,927 | 6/1979 | Capra et al. | 43/42 |
| 4,455,780 | 6/1984 | Keable | 43/42.04 |
| 4,777,760 | 10/1988 | Akaishi et al. | 43/42.37 |

FOREIGN PATENT DOCUMENTS

| | | |
|---|---|---|
| 59-34569 | 3/1984 | Japan . |
| 61-128970 | 8/1986 | Japan . |
| 63-23967 | 2/1988 | Japan . |

Primary Examiner—Richard K. Seidel
Assistant Examiner—Chuck Y. Mah
Attorney, Agent, or Firm—Beveridge, DeGrandi & Weilacher

[57] ABSTRACT

A fish capturing device or lure is disclosed which permits capturing a fish without damaging the mouth of the fish. A plurality of grooves are formed in the body of a lure 1 in the longitudinal direction thereof, and an expanding member 2 is contained in each of said grooves. An end of the expanding member 2 is fixed to a guide 3 and the other end thereof is slidably fitted to said guide 3. A tension spring for imparting tension to the line is arranged between said fixed end and said sliding end. When a fish bites the lure and tries to escape, the expanding member expands in the mouth cavity of fish under the effect of the force caused by the pull of the fish, and fiber rings or returns provided on the expanding member catch the inner wall of the mouth cavity and teeth of the fish, thus permitting capturing the fish.

10 Claims, 5 Drawing Sheets

FISH CAPTURING DEVICE

BACKGROUND OF THE INVENTION

1. Field of the Invention

The present invention relates to a fish capturing device or a lure for catching fish particularly suitable for use in lure fishing.

2. Description of the Related Art

Lure fishing, which comprises fishing with the use of a false bait, known as a lure, made from various materials such as metal and plastics, not a real bait, is now commanding general popularity as a sport. Available lures for lure fishing include diverse and various ones such as a plug, a spoon and a soft bait. Anglers are enjoying to fight with fishes by using several lures each in its proper way in response to the type of fish to be caught.

The structure of the conventional lures is described below. FIG. 14 is a side view illustrating a plug; FIG. 15 is a perspective view illustrating a spoon; and FIG. 16 is a perspective view illustrating a soft bait. In FIG. 14, 20 is a body; 21 is a lip; 22 is a body hook; 23 is a hook; and 24 is an eyelet, and a plug is composed of these components. The spoon and the soft bait shown in FIGS. 15 and 16 are also each composed of a body and a hook like a plug.

Each of the above-mentioned plug, spoon and soft bait is used by connecting a line to the eyelet thereof. The line is paid out from a reel attached to a rod. The lure connected to the line is cast into a fishing point in a river, for example, by rod casting. Then, the lure is made to simulate the fleeing motion of a small fish or a frog while reeling the line onto the reel to evoke the bait-taking action of the fish. When a fish bites at the lure, the hook of the lure catches the mouth of the fish, thus enabling the angler to catch the fish.

When using any of the lures mentioned above, however, the angler casts it into a fishing point in a river, for example, by rod casting. If there are threes and plants near the place, it is difficult to cast the lure into the prescribed fishing point because the hook of the lure may be trapped by a tree or a plant. When pulling up the lure, furthermore, there is another problem in that the hook may be caught by a duckweed, thus making it difficult to take back the lure. This practice is even dangerous sine the hook may catch a nearby person and cause him injury.

It is the usual practice in game fishing to fish for fishes such as black bass and then to release them. The fish thus caught is injured by the hook, and when released with such injury, bacteria may enter through such wound and shorten the life of the fish. Fishes once released then avoid biting a lure for fear of the hook. In a fishing pond, in particular, this may spoil anglers' interest in fishing.

In view of these circumstances as mentioned above, the object of the present invention is to solve the problems described above by providing a novel fish capturing device which permits fishing without damaging the fish mouth.

DISCLOSURE OF THE INVENTION

The means taken in the present invention to achieve the above-mentioned object is a fish capturing device for catching a fish, and is characterized in that an expanding member which expands in the fish mouth when the fish bites the fish capturing device is attached to the body of this fish capturing device.

When a fish bites the lure, the expanding member expands in the mouth cavity of the fish, and fiber rings or returns catch the inner wall of the mouth or teeth, thus permitting fish catching.

DETAILED EXPLANATION OF THE PREFERRED EMBODIMENTS

Preferred embodiments of the present invention are described below.

Figure 1:
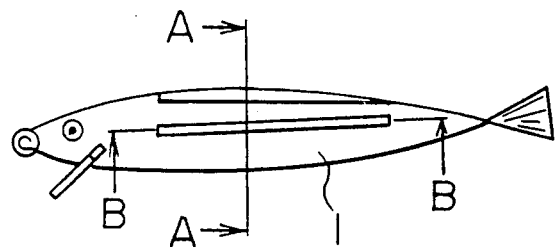
FIG. 1 is a side view illustrating the lure of a first embodiment of the present invention.
Figure 2:
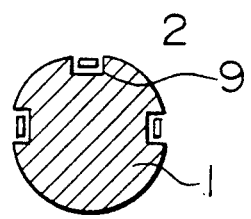
FIG. 2 is a sectional view of FIG. 1 cut along the line A—A.
Figure 3:
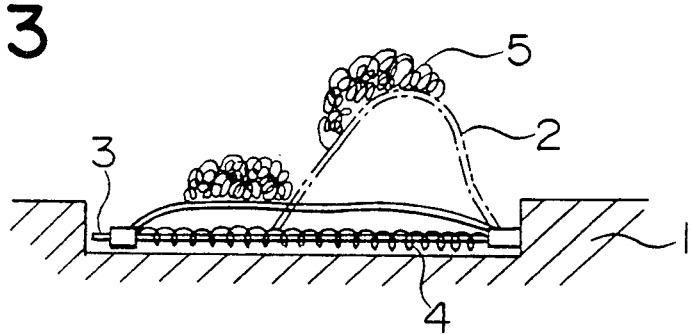
FIG. 3 is a configurational view illustrating the expanding member of the first embodiment of the present invention.

FIG. 1 is a side view illustrating the lure as an embodiment of the present invention; FIG. 2 is a sectional view of FIG. 1 cut along the line A—A; and FIGS. 3 and 4 are side views illustrating expanding members of other configurations for capturing a fish.

In FIGS. 1 and 2, a plurality of a grooves are formed on the body 1 of the lure in the longitudinal direction of the body. An expanding member 2 which expands in the mouth cavity of the fish is contained in each of these grooves. The configuration of the expanding member is described with reference to FIG. 3. One end of the expanding member 2 is fixed to a guide 3, and the other end thereof is slidably fitted to the guide 3. A tension spring for imparting a tension to the lien is arranged between the fixed and sliding ends. The expanding member is made of a material excellent in elasticity (e.g., a synthetic resin material for a piano wire) as shown in FIG. 3, and has the sliding end which, when sliding along the guide, largely expands as shown in the drawing.

Figure 4:
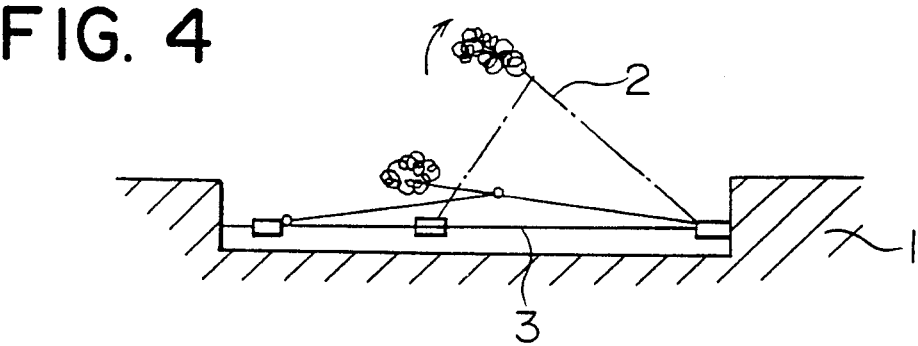
FIG. 4 is a configurational view illustrating the expanding member of a second embodiment of the present invention.

The expanding member may be formed with an improved opening mechanism of the folding umbrella as shown in FIG. 4. A tension spring is arranged between the expanding member and the guide also in this case. In the case of the expanding member as shown in FIG. 4, the elasticity of the expanding member itself, acting in the direction as indicated by the arrow in FIG. 4 when a fish bites this hook, strongly presses the expanding member against the inner wall of the mouth cavity of the fish, and the mouth of the fish is unable to come off the hook.

Figure 5:
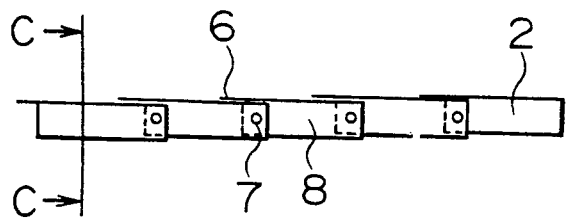
FIG. 5 is a side view illustrating the expanding member of a third embodiment of the present invention.
Figure 6:
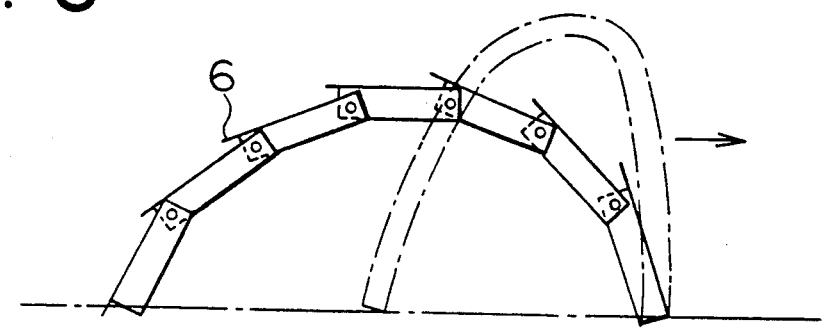
FIG. 6 is a functional view illustrating the expanding member of the third embodiment of the present invention.
Figure 7:
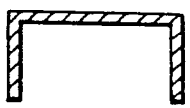
FIG. 7 is a sectional view illustrating the expanding member of the third embodiment of the present invention.
Figure 7:
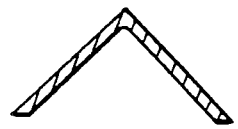
Figure 7:
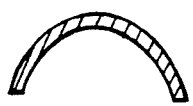
Figure 8:
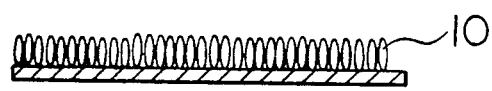
FIG. 8 illustrates a fiber ring provided on the surface of the expanding member of the present invention.
Figure 9:
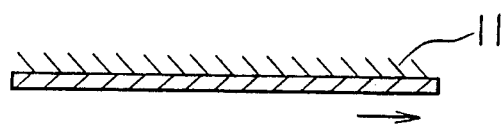
FIG. 9 illustrates a scale-shaped return provided on the surface of the expanding member of the present invention.

Fiber rings or returns, which catch the inner wall of the mouth cavity and teeth of the fish as shown in FIGS. 8 and 9, are formed on the surface of the expanding member. A plurality of returns in the form of fish scales may be formed on the surface of the expanding member. The fiber rings have a configuration like one side of a Magic Fastener (registered trademark), and is attached to the surface of the expanding member. With the expanding member as shown in FIG. 3, a strong pull of the fish may cause the expanding member to turn around and the fish may thus escape. In such a case, an expanding member having the mechanism as shown in FIGS. 5, 6 and 7 may be used. This expanding member is formed by connecting a number of small connecting members as shown in FIG. 5. To avoid reversal, a stopper is provided at one end of each connecting member, and reversal is prevented under the effect of this stopper as shown in FIG. 6. The connecting member is formed so as to give a triangular, square or semi-circular cross-sectional shape as shown in FIG. 7 to prevent falling of the connecting member in the vertical direction relative to the plane of the drawing in FIG. 6.

This lure is used in connection with a line in the same manner as with a conventional lure. By casting it into a fishing point in a river by rod and causing the bait taking action of the fish while drawing in the line, the fish snaps at the lure. When the fish bites the lure and tries to escape, a tension acts on the line, so that the expanding member expands in the mouth cavity of the fish in opposition to the force of the tension spring. The fiber rings (10) or the returns (11) provided on the expanding member trap the inner wall mouth or the teeth of the fish, thus permitting capturing the fish. A stronger pull of the fish leads to a larger expansion of the expanding member in the mouth cavity of the fish, and the tension spring prevents loosening of the line. As a result, this fish capturing device is unable to come off the mouth of the fish.

Figure 10:
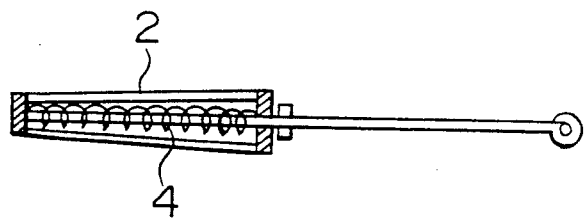
FIG. 10 is a configurational view illustrating the lure of a fourth embodiment of the present invention.
Figure 10:
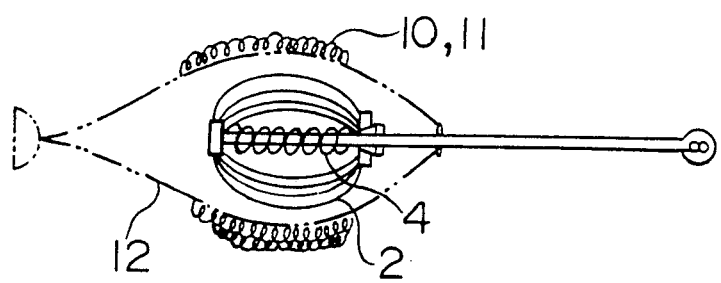
Figure 11:
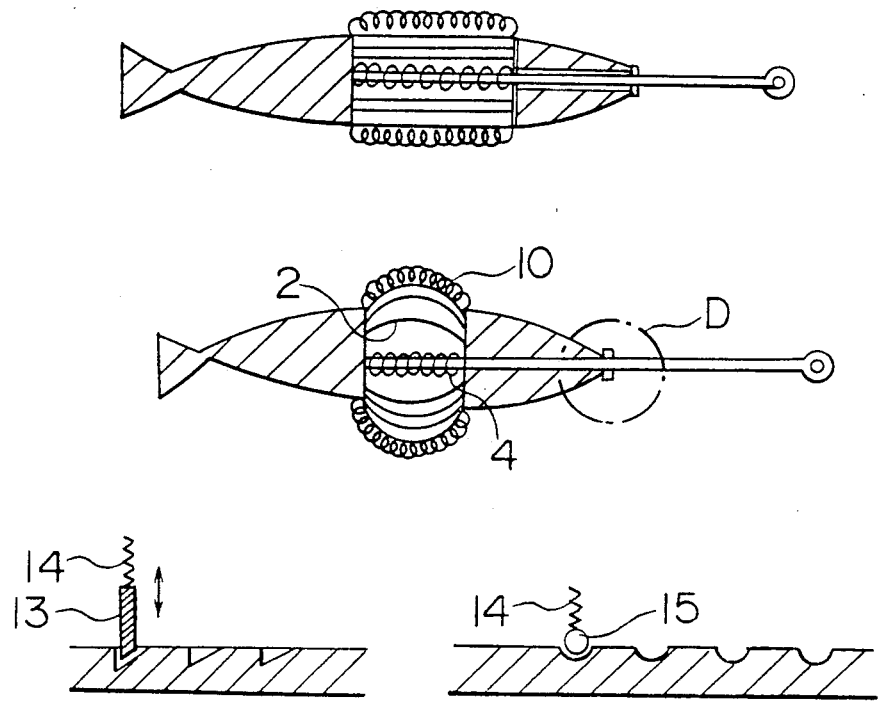
FIG. 11 is a configurational view illustrating the lure of a fifth embodiment of the present invention.

FIGS. 10 and 11 illustrate examples each incorporating an expanding mechanism in a soft bait (12) or the body of a lure, which performs the same functions as above. As shown in FIG. 11, the expanding member may be provided with a known detent mechanism comprising a ball (15) and spring (14) or an engagement pawl (13) and a spring (14), to maintain the expanded state of the expanding member.

Figure 12:
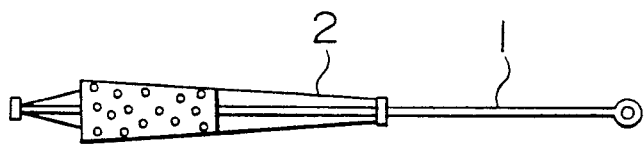
FIG. 12 is a configurational view illustrating the fish capturing device of a sixth embodiment of the present invention.
Figure 13:
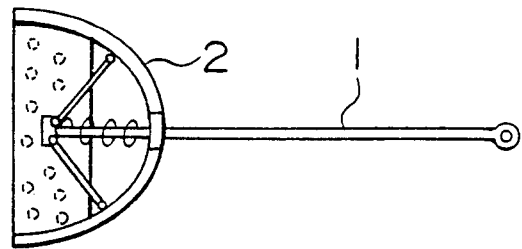
FIG. 13 is a functional view illustrating the expanding member of the fish capturing device of the sixth embodiment of the present invention.
Figure 14:
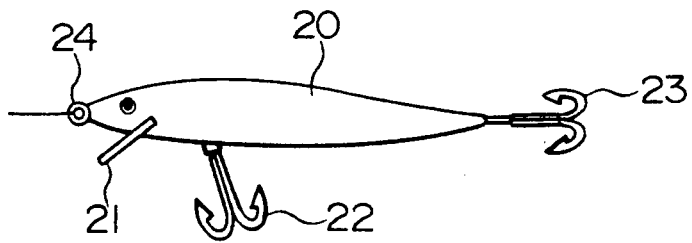
FIG. 14 is a side view illustrating a conventional plug.
Figure 15:
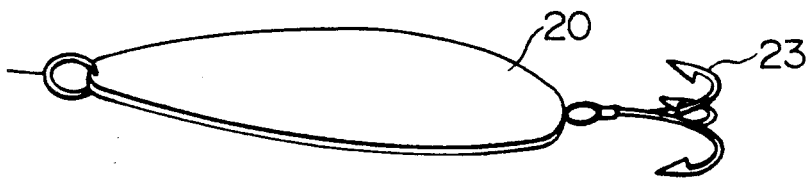
FIG. 15 is a side view illustrating a conventional spoon.
Figure 16:
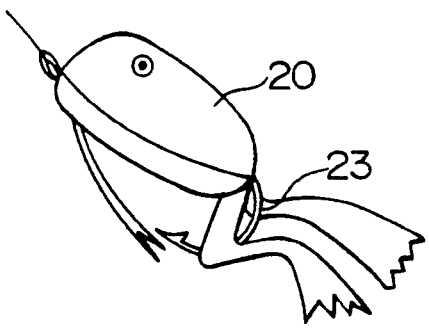
FIG. 16 is a side view illustrating a conventional soft bait.

FIGS. 12 and 13 illustrate fish capturing devices taking the place of the hook attached to the conventional lure. In these embodiments, a plurality of the expanding members having a mechanism shown in FIG. 4 described above are fitted to a single body so as to permit expansion of the expanding member just as a folding umbrella. In this case, the expanding member 2 is formed using an elastic material such as plastics or a piano wire, and the surface of this expanding member is provided with many scale-shaped returns, or the surface of a cloth applied to the surface of the expanding member like the cloth of an umbrella is provided with many fiber rings. A fish can be captured with the use of this fish capturing device based on the same principle as that for the above-mentioned lure. A bundle of fibers may be used in place of the fiber ring described as to the above embodiment. The expanding member may be formed into an integral body from a synthetic resin.

The above-mentioned embodiments have covered the mechanism in which the expanding member 2 expands when tension acts on the line, but it is also possible to cause the expanding member 2 to expand by means of elasticity of the spring operating upon detection of the capturing device held in the mouth of a fish.

According to the present invention, as described above in detail, it is possible to eliminate the risk of the lure being caught by a tree or a plant near the angler even when the lure is cast into a fishing point in a river, and to avoid the inconvenience of difficult recovery of the lure often experienced when the hook is trapped by duckweed in the river, because of the absence of a hook in the fish capturing device and the lure unlike the conventional one. Occurrence of an accident in which a hook injures a nearby person is also prevented.

Fishes such as black bass for game fishing are released in many cases after once catching them with the use of a lure. In this case also, the absence of a hook makes it possible to avoid damage to the fish and prevent the life of the fish from being reduced by bacteria entering through wounds. A fish thus released usually tends to bite the lure less frequently because of its fear of the hook thereof. The fish capturing device of the present invention arouses in contrast the fighting spirit of fishes, and thus provides excellent effects including an increased interest in fishing.

The present invention can be applied in various other forms without deviating from the spirit or main features thereof. The above-mentioned embodiments are therefore only examples in all respects and should not be interpreted as limiting. The scope of the present invention is indicated by the claims presented hereafter and is not bound in any manner by the text of this specification. All variation and changes falling under the scope of this claims are within the scope of the present invention.

What is claimed is:

1. A fish capturing device for landing a fish, which comprises a body member having a head portion to be connected to a line and an expandable member having end portions, which expands in the mouth of the fish biting the same and catches the inner wall of the mouth or teeth of the fish, wherein one end portion of expandable member is fixed to a rear portion of the body member, another end portion of the expandable member is slidably attached to the body member and a portion of the expandable member between the end portions thereof is expandable.

2. A fish capturing device as claimed in claim 1, wherein: said expandable member is provided with fiber members which entangle with the teeth of the fish.

3. A fish capturing device as claimed in claim 1, wherein: said expandable member is provided with returns which catch the inner wall of the mouth cavity of the fish.

4. A fish capturing device as claimed in claim 1, wherein said expandable member which, when a fish bites the fish capturing device, expands in the mouth of the fish under the effect of tensile force acting on the line, and a spring, which acts to impart tension to the line, between said expandable member and said body member.

5. A fish capturing device as claimed in claim 1, further comprising a stopper which prevents said expandable member from reversal of expanding direction when the expandable member expands and presses against inside of the mouth of the fish.

6. A fish capturing device as claimed in claim 1, further comprising an engaging member which engages and maintains the expanded state of the expandable member when said expandable member expands.

7. A lure for landing fish which comprises a body member and an expandable member attached to said body member, said expandable member having end portions expanding in the mouth of a fish biting the lure and catching the inner wall of the mouth or teeth of the fish and which is free of hooks thereby permitting capturing of the fish without damaging the mouth of the fish, wherein one end portion of the expandable member is fixed to a rear portion of the body member, another end portion of the expandable member is slidably attached to the body member and a portion of the expandable member between the end portions thereof is expandable.

8. A lure as claimed in claim 7, further comprising a stopper which prevents said expandable member from reversal when the expandable member expands and presses the inner wall of the mouth of the fish.

9. A lure as claimed in claim 7, further comprising an engaging member which engages and maintains the expanded state of the expandable member when said expandable member expands.

10. A fish capturing device for landing a fish, which comprises a body member having a head portion to be connected to a line and an expandable member having end portions, which expands in the mouth of a fish biting the same and catches the inner wall of the mouth or teeth of the fish, wherein one end portion of expandable member is fixed to a rear portion of the body member, another end portion of the expandable member is slidably attached to the body member and a portion of the expandable member between the end portions thereof is elastically deformable.

* * * * *